(12) United States Patent
De Pottey

(10) Patent No.: US 7,631,625 B2
(45) Date of Patent: Dec. 15, 2009

(54) GLOW PLUG LEARN AND CONTROL SYSTEM

(75) Inventor: Bradley E. De Pottey, Burton, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 346 days.

(21) Appl. No.: 11/637,233

(22) Filed: Dec. 11, 2006

(65) Prior Publication Data

US 2008/0140295 A1      Jun. 12, 2008

(51) Int. Cl.
*F02N 17/02*    (2006.01)
*H05B 1/02*    (2006.01)

(52) U.S. Cl. ............................ 123/179.21; 123/179.6; 219/497

(58) Field of Classification Search ............ 123/179.21, 123/179.6, 142.5 R, 145 A; 219/270, 482, 219/490; 701/99, 101
See application file for complete search history.

(56) References Cited

U.S. PATENT DOCUMENTS

| | | | | |
|---|---|---|---|---|
| 4,130,853 A | * | 12/1978 | Baker | 361/264 |
| 4,312,307 A | * | 1/1982 | Cooper | 123/145 A |
| 4,322,604 A | * | 3/1982 | Kawamura et al. | 219/497 |
| 4,858,825 A | * | 8/1989 | Kawamura | 237/2 A |
| 2003/0019865 A1 | | 1/2003 | Whitney | |

* cited by examiner

*Primary Examiner*—Michael Cuff
*Assistant Examiner*—Ka Chun Leung

(57) ABSTRACT

A system and method for controlling a temperature of a combustion chamber heater of an engine includes a calculation module that determines a temperature of the combustion chamber heater based on an effective resistance of the combustion chamber heater, and a control module that controls the temperature of the combustion chamber heater by commanding a duty cycle of the combustion chamber heater based on an operating temperature signal of the combustion chamber heater and a desired temperature of the combustion chamber heater.

15 Claims, 4 Drawing Sheets

GLOW PLUG LEARN AND CONTROL SYSTEM

FIELD OF THE INVENTION

The present invention relates to diesel engines, and more particularly to controlling a combustion chamber heater.

BACKGROUND OF THE INVENTION

The statements in this section merely provide background information related to the present disclosure and may not constitute prior art.

Diesel engine operation involves combustion that generates exhaust gas. During combustion, an air/fuel mixture is delivered through an intake valve to cylinders and is combusted therein. Diesel engines produce heat to ignite the air/fuel mixture by compressing air in the cylinders and a combustion chamber.

During cold state conditions, the engine, engine oil, and cooling water may be cold. Heat generated during the initial revolutions of the engine is conducted away from the combustion chamber by the cold surroundings, thereby preventing ignition within the combustion chamber. Combustion efficiency is greatly reduced when the engine is cold. Glow plugs are used to heat the combustion chamber of the diesel engine during cold start conditions. As a result, glow plugs are critical components in emission controls of diesel engines. However, damage to a glow plug may result from overheating or burning out if the glow plug exceeds an appropriate operating temperature.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

A system and method for controlling a temperature of a combustion chamber heater of an engine includes a calculation module that determines a temperature of the combustion chamber heater based on an effective resistance of the combustion chamber heater, and a control module that controls the temperature of the combustion chamber heater by commanding a duty cycle of the combustion chamber heater based on an operating temperature signal of the combustion chamber heater and a desired temperature of the combustion chamber heater.

In other features, the system further comprises an error module that calculates an error resistance between the combustion chamber heater and a standard combustion chamber heater based on an initial resistance of the combustion chamber heater and an expected resistance of the standard combustion chamber heater. The expected resistance is based on a coolant temperature and the initial resistance is based on a first ignition voltage of the engine and a first current supplied to the combustion chamber heater.

In other features, the effective resistance is based on the error resistance and a second resistance of the combustion chamber heater that is determined based on a second ignition voltage of the engine and a second current supplied to the combustion chamber heater. The control module commands the duty cycle of the combustion chamber heater when the operating temperature signal falls below the desired temperature signal. The error module calculates the error resistance when the engine enters a start cycle and the coolant temperature falls below a temperature threshold.

A system for controlling a combustion chamber heater in an engine includes a combustion chamber heater, and a control module that controls a temperature of the combustion chamber heater based on a coolant temperature of the engine, ignition voltage of the engine, and current supplied to the combustion chamber heater.

In other features, the system further comprises an error module that calculates an error resistance between the combustion chamber heater and a standard combustion chamber heater based on an initial resistance of the combustion chamber heater and an expected resistance of the standard combustion chamber heater. The expected resistance is based on the coolant temperature and the initial resistance is based on a first ignition voltage of the engine and a first current supplied to the combustion chamber heater, the coolant temperature equates to an initial temperature of the combustion chamber heater.

In other features, the system further comprises a calculation module that determines the temperature of the combustion chamber heater based on an effective resistance of the combustion chamber heater. The effective resistance is based on the error resistance and a second resistance of the combustion chamber heater. The second resistance is based on a second ignition voltage of the engine and a second current supplied to the combustion chamber heater. The control module commands a duty cycle of the combustion chamber heated based on the temperature of the combustion chamber heater and a desired temperature of the combustion chamber heater.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
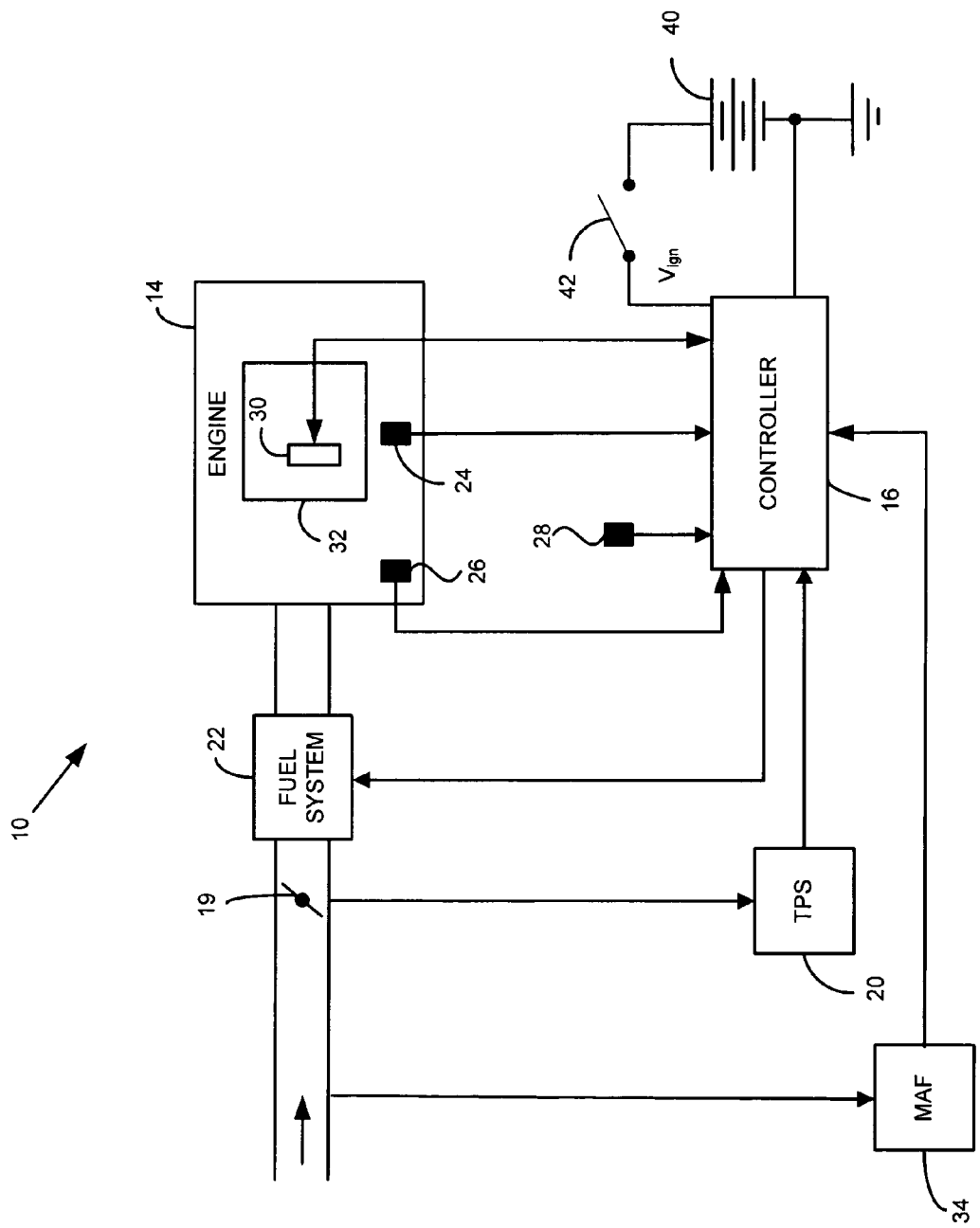
FIG. 1 is a functional block diagram of an exemplary diesel engine system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine control system 10 of an engine 14 is shown. The controller 16 communicates with various components of the engine control system 10 including, but not limited to, a throttle position sensor (TPS) 20, a fuel system 22, an engine speed sensor 24, an engine coolant temperature (Tcool) sensor 26, an ambient temperature (Tamb) sensor 28, and a combustion chamber heater 30 within a combustion chamber 32 of the engine 14. In the present implementation, the combustion chamber heater 30 includes a glow plug. However, it can be appreciated that various other embodiments of the combustion chamber heater 30 are contemplated within the scope of this invention. Additionally, although a single glow plug 30 is illustrated, it is appreciated that the engine control system 10 of the present invention can be implemented in engines having a plurality of glow plugs.

The engine speed sensor 24 determines an engine speed in rotations per minute (RPM). The TPS 20 determines a position of the throttle 19. The throttle 19 regulates airflow into the engine 14. The controller 16 receives a mass air flow (MAF) from the MAF sensor 34 and determines air flow into the engine 14 accordingly.

The controller 16 receives a Tamb signal from the Tamb sensor 28 and a Tcool signal from the Tcool sensor 26. The controller 16 is coupled to a vehicle storage battery 40 via an ignition switch 42, and supplies current to a heater element (not shown) of the glow plug (GP) 30. The controller 16 monitors current supplied to the GP 30.

Figure 2:
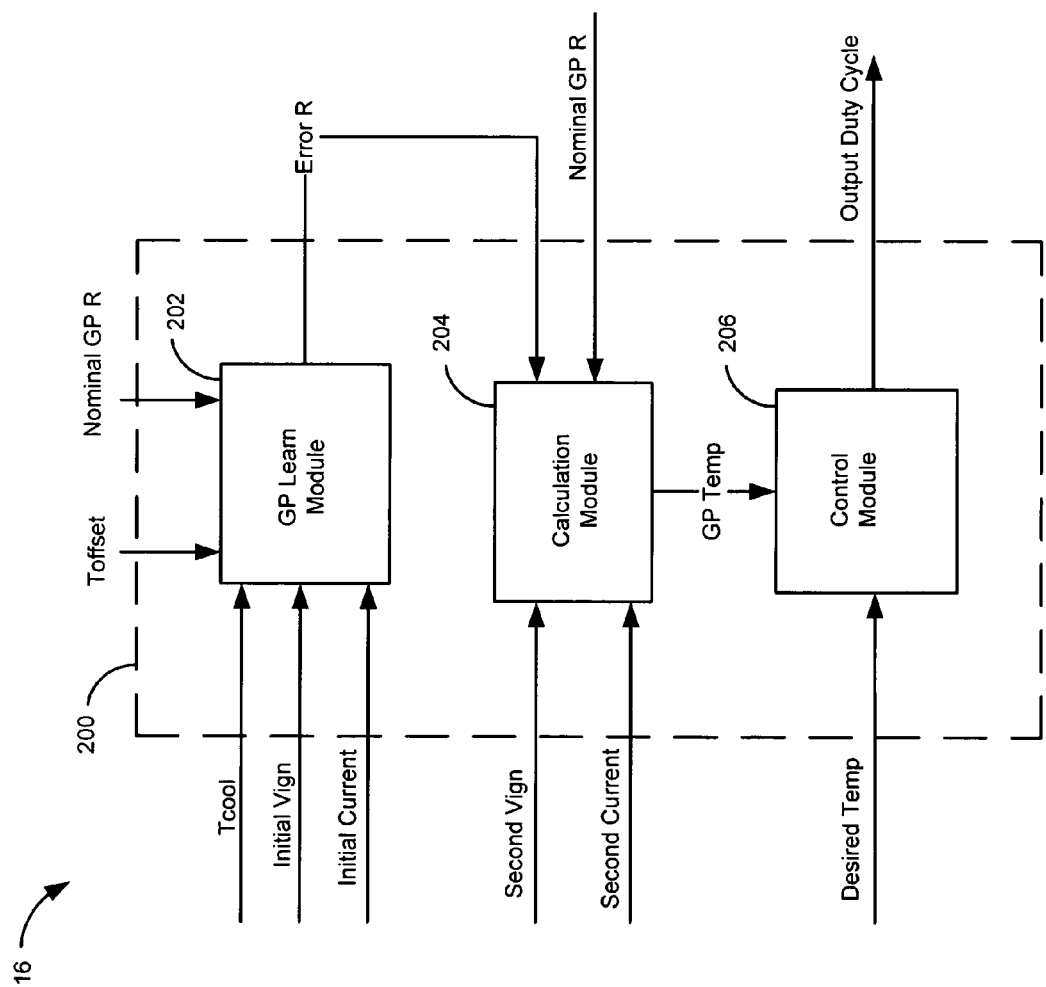
FIG. 2 is a block diagram depicting a glow plug (GP) control system in accordance with the present invention.

Referring now to FIG. 2, a glow plug control system 200 of the controller 16 includes a GP learn module 202, a calculation module 204, and a control module 206. The GP learn module 202 receives a Tcool signal from the Tcool sensor 26, an initial ignition voltage signal (initial Vign), and a calibrated standard GP resistance (R). The initial Vign and initial current represent the voltage and current, respectively, of the glow plug 30 upon activation. The GP 30 heats the combustion chamber 32 to assist ignition during cold conditions. The Tamb represents a standard (ambient) room temperature (e.g. 20 degrees Celsius) and serves as a calibrated room temperature offset (Toffset) to the Tcool. Generally, at engine start-up (where the engine 14 has been inactive for a period of time, e.g. 5 hours), the Tamb and Tcool are substantially equal. At engine start-up, the temperature of the GP 30 is assumed to equal the Tcool. The nominal GP R represents a resistance of a nominal or standard GP at room temperature.

The GP learn module 202 determines the characteristics of the GP 30 by calculating an error R between an expected R for a nominal GP and an initial R of the GP 30 upon activation. The GP learn module 202 generates the error R for all engine start-ups. The error R signal is transmitted to the calculation module 204 and stored in a non-volatile memory (not shown). Typically, the GP learn module 202 operates once per ignition cycle when the engine 14 has been inactive for a period of time.

The calculation module 204 determines an operating temperature measurement of the GP 30 (GP temp) based on the error R signal and the impedance characteristics of the GP 30. The calculation module 204 receives the error R signal from the GP learn module 202, subsequent, or second, Vign and current readings of the GP 30, and the nominal GP R. The calculation module 204 calculates the operating GP temp and transmits an operating GP temp signal to the control module 206. Typically, the calculation module 204 operates periodically (e.g. every 100 ms).

The control module 206 controls the duty cycle of the GP 30 based on the operating GP temp signal and a calibrated desired temperature (desired temp). The control module 206 provides a closed loop control method and can include, but is not limited to, a proportional-integral-derivative (PID) controller with pulse width modulation, a switch, and a discrete deadband control. Typically, the control module 206 operates periodically (e.g. every 100 ms).

Figure 3A:
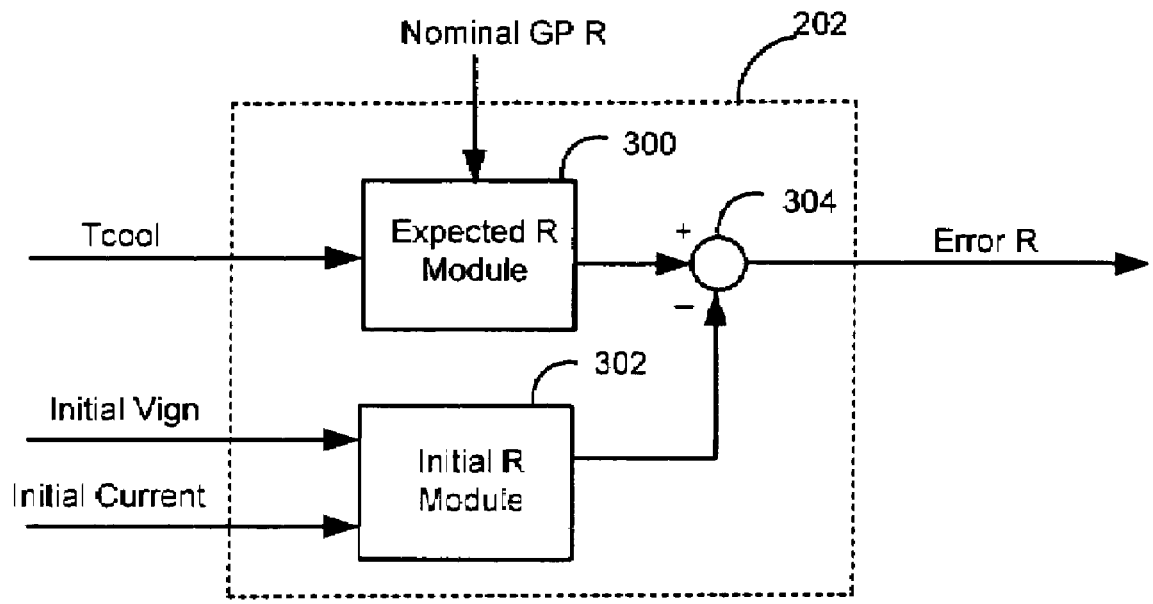
FIG. 3A is a block diagram depicting a GP learn module according to the present invention.
Figure 3B:
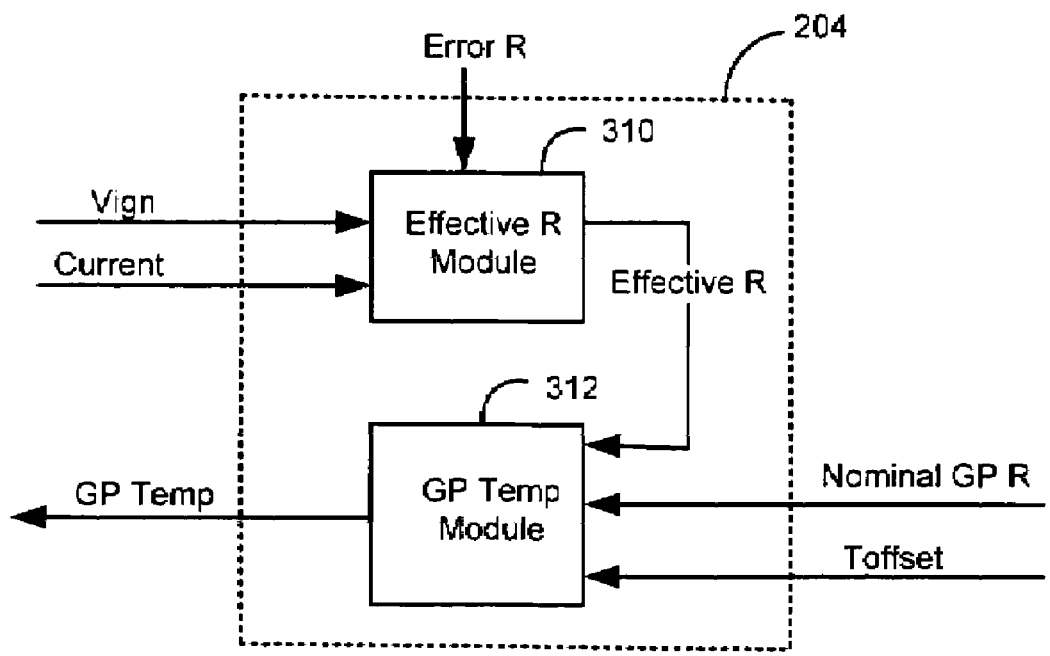
FIG. 3B is a block diagram depicting a calculation module according to the present invention.

Referring now to FIGS. 3A and 3B, the GP learn module 202 and calculation module 204, respectively, are shown in more detail. The GP learn module 202 includes an expected R module 300 and an initial R module 302. The expected R module 300 references a calibrated temperature versus R relationship provided by a manufacturer of the GP 30 based on the Tcool. For example, the relationship can include a change in degrees Celsius per 1 ohm change in R.

The Initial R module 302 calculates an initial R of the GP 30 based on the initial Vign and the initial current. The value of the initial R is determined according to the following equation:

$$\text{Initial } R = \frac{\text{Initial Vign}}{\text{Initial Current}} \quad (1)$$

A first comparator 304 calculates the error R based on the expected R and the initial R of the GP 30. In various embodiments, the value of the error R can be determined according to the following equation:

$$\text{Error } R = 1 + \frac{\text{Initial } R - \text{Expected } R}{\text{Expected } R} \quad (2)$$

The calculation module 204 includes an effective R module 310 and a GP temperature module 312. The effective R module 310 periodically calculates a resistance of the GP 30 based on subsequent, or second, readings of the Vign and the current of the GP 30. The effective R module 310 then determines the effective R of the GP 30 based on the resistance of the GP 30 and the error R received from the GP learn module 202. The effective R module 310 transmits the effective R of the GP 30 to the GP temperature module 312.

The GP temperature module 312 periodically (e.g. every 100 ms) calculates a R difference between the effective R and the nominal GP R. The GP temperature module 312 then determines a temperature corresponding to the R difference based on the calibrated temperature versus R relationship. The GP temperature module 312 transmits an operating GP temp to the control module 206. The operating GP temp is based on the temperature corresponding to the R difference.

The control module 206 determines a temp error based on a difference between the desired GP temp and the operating GP temp that is received from the GP temperature module 312. The control module 206 provides a closed loop control method coupled to the GP 30 and can include, but is not limited to, a proportional-integral-derivative (PID) controller with pulse width modulation, a switch, and a discrete deadband control.

Figure 4B:
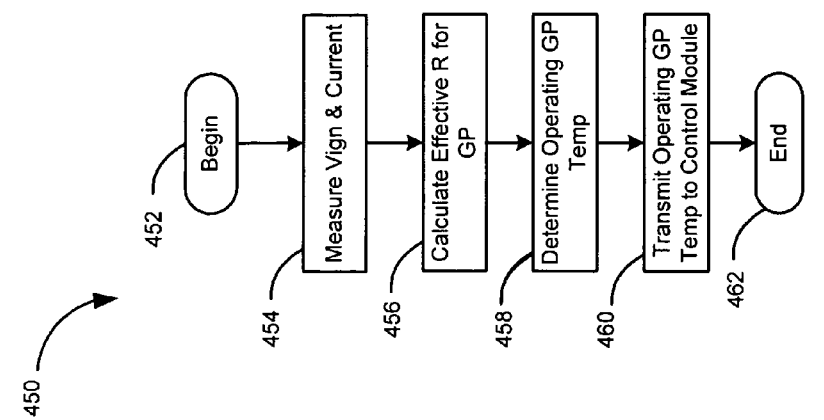
FIG. 4B is a flowchart illustrating exemplary steps executed by the calculation module according to the present invention.
Figure 4A:
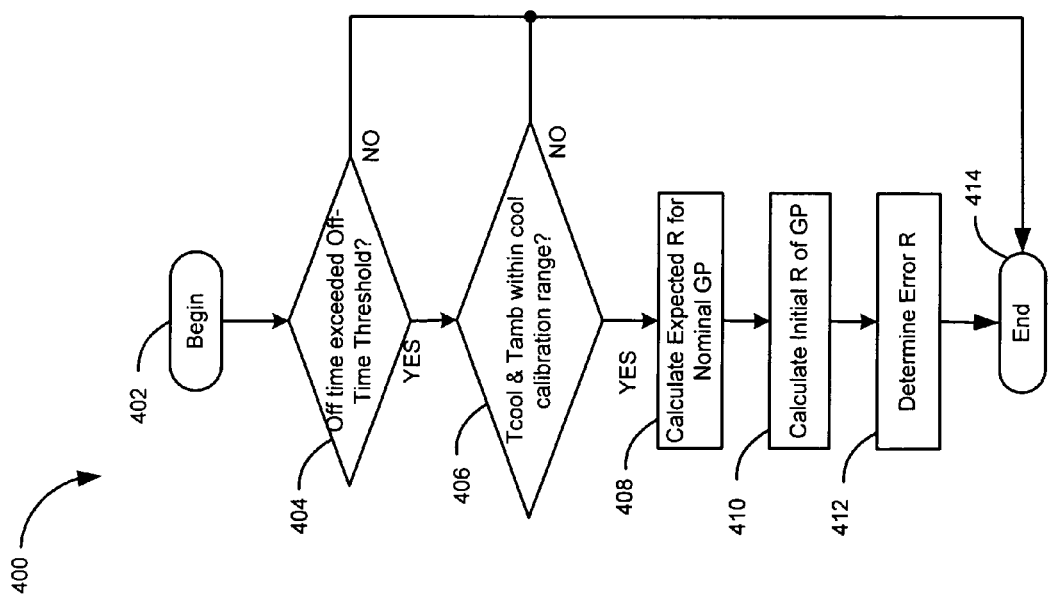
FIG. 4A is a flowchart illustrating exemplary steps executed by the GP learn module according to the present invention.

Referring now to FIG. 4A, a method 400 illustrating the operation of the GP learn module 202 will be discussed in more detail. Control begins the method 400 in step 402. In step 404, control determines whether a period of inactivity, or "off-time", of the engine 14 has exceeded a calibrated off-time threshold. It is anticipated that the threshold may include other engine 14 operating parameters such as temperature of engine 14. If control determines the engine 14 has not exceeded the calibrated off-time threshold, control proceeds to step 414. If control determines the engine 14 has exceeded the calibrated off-time threshold, control proceeds to step 406.

In step 406, control determines whether the Tamb and Tcool are within a coolant calibration range. Control estimates the Tcool to equate to an engine 14 operating temperature. If control determines that Tamb and Tcool are not within a coolant calibration range, control proceeds to step 414. If control determines that Tamb and Tcool are within a coolant calibration range, control proceeds to step 408. In step 408, control calculates the expected R for a nominal GP at the Tcool. In step 410, control calculates the initial R of the GP 30 upon activation. In step 412, control determines the error R of the GP 30 between the expected R and the initial R of the GP 30. In step 414, the method 400 ends.

Referring now to FIG. 4B, a method 450 illustrating the operation of the calculation module 204 will be discussed in more detail. Control begins the method 450 in step 452. In step 454, control measures the subsequent, or second, Vign and current of the GP 30. In step 456, control calculates the effective R of the GP 30. In step 458, control determines the operating GP temp of the GP 30. In step 460, control transmits the operating GP temp to the control module 206. In step 462, the method 450 ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system for controlling a combustion chamber heater in an engine, comprising:
   a combustion chamber heater located in a cylinder of the engine that heats a combustion chamber in the cylinder; and
   a control module that controls a temperature of the combustion chamber heater based on a coolant temperature of the engine, an ignition voltage of the engine, and a current supplied to the combustion chamber heater.

2. The system of claim 1 further comprising:
   an error module that calculates an error resistance between the combustion chamber heater and a standard combustion chamber heater based on an initial resistance of the combustion chamber heater and an expected resistance of said standard combustion chamber heater.

3. The system of claim 2 wherein said expected resistance is based on said coolant temperature and said initial resistance is based on a first ignition voltage of the engine and a first current supplied to the combustion chamber heater, said coolant temperature equates to an initial temperature of the combustion chamber heater.

4. The system of claim 2 further comprising a calculation module that determines said temperature of the combustion chamber heater based on an effective resistance of the combustion chamber heater.

5. The system of claim 4 wherein said effective resistance is based on said error resistance and a second resistance of the combustion chamber heater.

6. The system of claim 5 wherein said second resistance is based on a second ignition voltage of the engine and a second current supplied to the combustion chamber heater.

7. The system of claim 4 wherein said control module commands a duty cycle of the combustion chamber heater based on said temperature of the combustion chamber heater and a desired temperature of the combustion chamber heater.

8. A system for controlling a temperature of a combustion chamber heater of an engine, comprising:
   a calculation module that determines a temperature of the combustion chamber heater based on an effective resistance of the combustion chamber heater;
   an error module that calculates an error resistance between the combustion chamber heater and a standard combustion chamber heater based on an initial resistance of the combustion chamber heater and an expected resistance of said standard combustion chamber heater, wherein said expected resistance is based on a coolant temperature and said initial resistance is based on a first ignition voltage of the engine and a first current supplied to the combustion chamber heater; and
   a control module that controls the temperature of the combustion chamber heater by commanding a duty cycle of the combustion chamber heater based on an operating temperature signal of the combustion chamber heater and a desired temperature of the combustion chamber heater.

9. The system of claim 8 wherein said effective resistance is based on said error resistance and a second resistance of the combustion chamber heater that is determined based on a second ignition voltage of the engine and a second current supplied to the combustion chamber heater.

10. The system of claim 8 wherein said control module commands said duty cycle of the combustion chamber heater when said operating temperature signal falls below said desired temperature signal.

11. The system of claim 8 wherein said error module calculates said error resistance when said engine enters a start cycle and said coolant temperature falls below a temperature threshold.

12. A method for controlling a temperature of a combustion chamber heater of an engine, comprising:
   determining a temperature of the combustion chamber heater based on an effective resistance of the combustion chamber heater;
   calculating an error resistance between the combustion chamber heater and a standard combustion chamber heater based on an initial resistance of the combustion chamber heater and an expected resistance of said standard combustion chamber heater, wherein the initial resistance is based on a first ignition voltage of the engine and a first current supplied to the combustion chamber heater, and wherein the expected resistance is based on a coolant temperature; and
   controlling the temperature of the combustion chamber heater by commanding a duty cycle of the combustion chamber heater based on an operating temperature signal of the combustion chamber heater and a desired temperature of the combustion chamber heater.

13. The method of claim 12 wherein said effective resistance is based on said error resistance and a second resistance of the combustion chamber heater, said second resistance is based on a second ignition voltage of the engine and a second current supplied to the combustion chamber heater.

14. The method of claim 12 further comprising commanding said duty cycle of the combustion chamber heater when said operating temperature signal falls below said desired temperature signal.

15. The method of claim 12, further comprising calculating said error resistance when said engine enters a start cycle and said coolant temperature falls below a temperature threshold.

* * * * *